Sept. 15, 1964  W. W. KLEIN, JR., ETAL  3,149,303
SEISMIC CROSS-SECTION PLOTTER
Filed Sept. 29, 1959  8 Sheets-Sheet 2
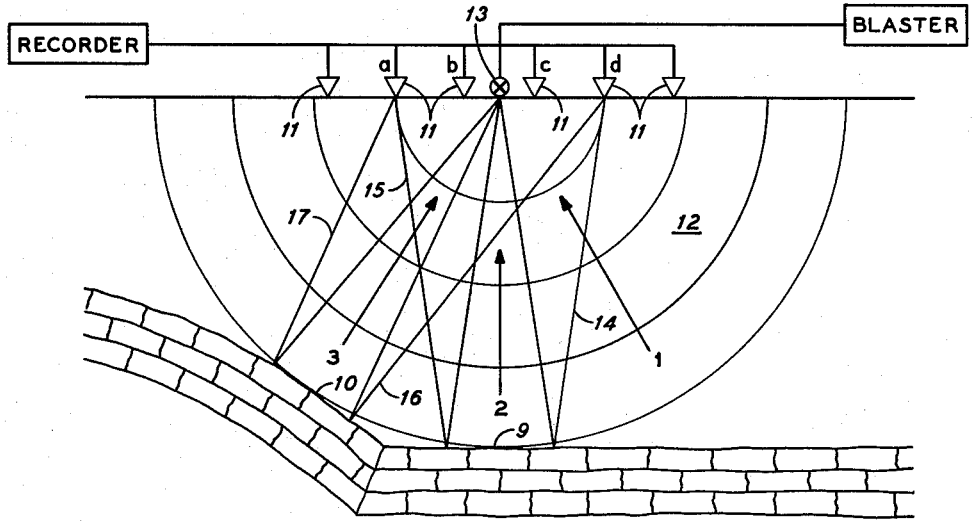
FIG. 2
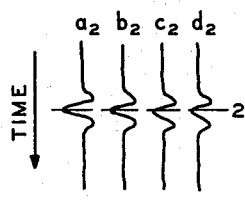
FIG. 3
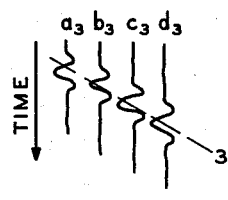
FIG. 4
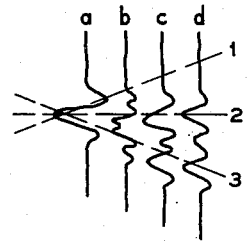
FIG. 5
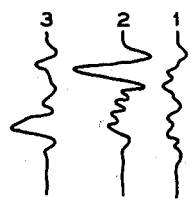
FIG. 6
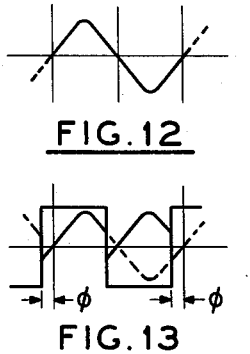
FIG. 11
FIG. 12
FIG. 13
FIG. 14
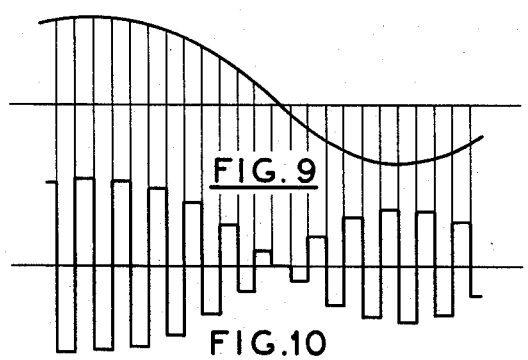
FIG. 9
FIG. 10
INVENTORS
WALTER W. KLEIN, JR.
PAUL M. AAGAARD
OKE A. FREDRIKSSON
WILLIAM E. SHOEMAKER
LEE P. STEPHENSON
BY
ATTORNEYS

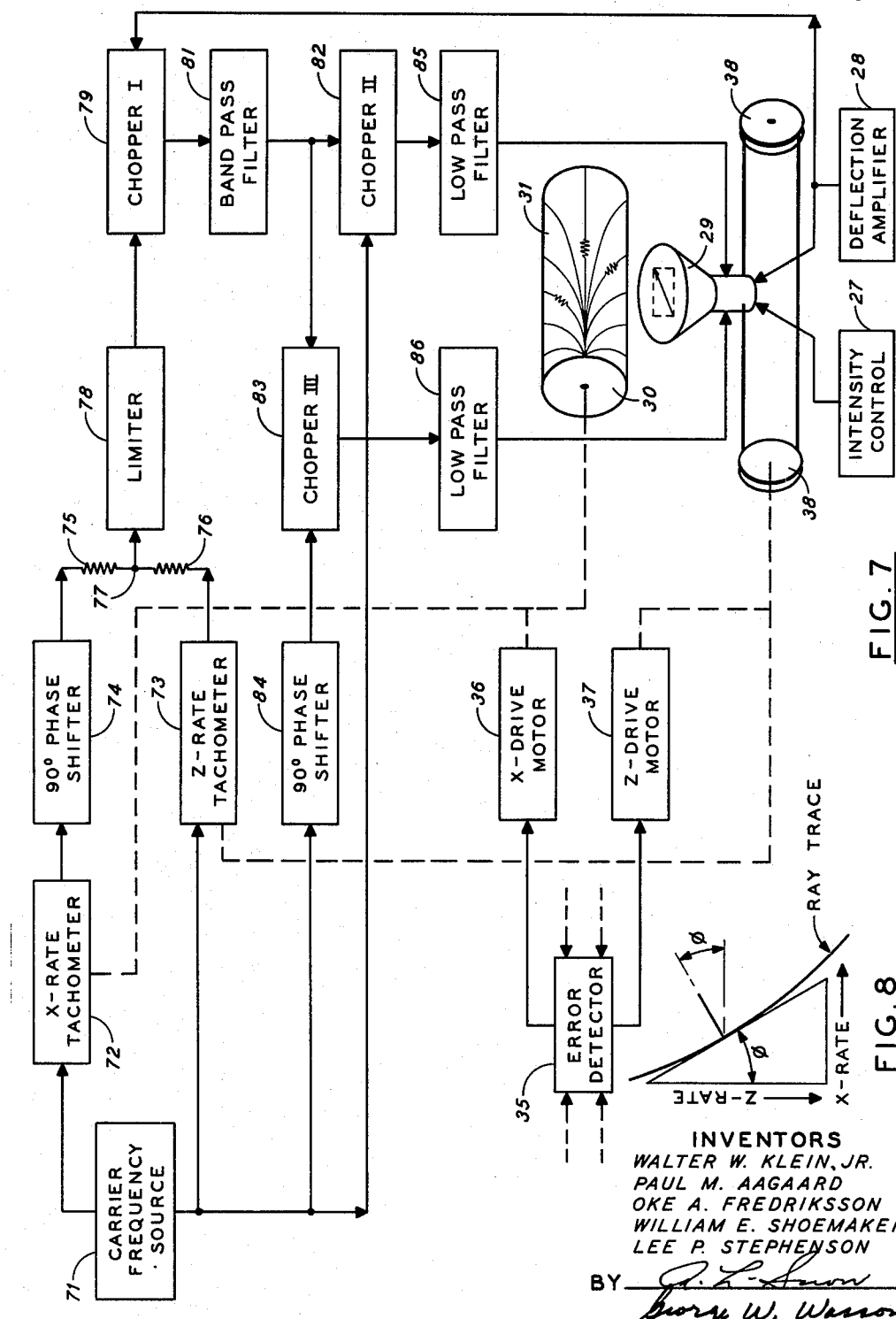

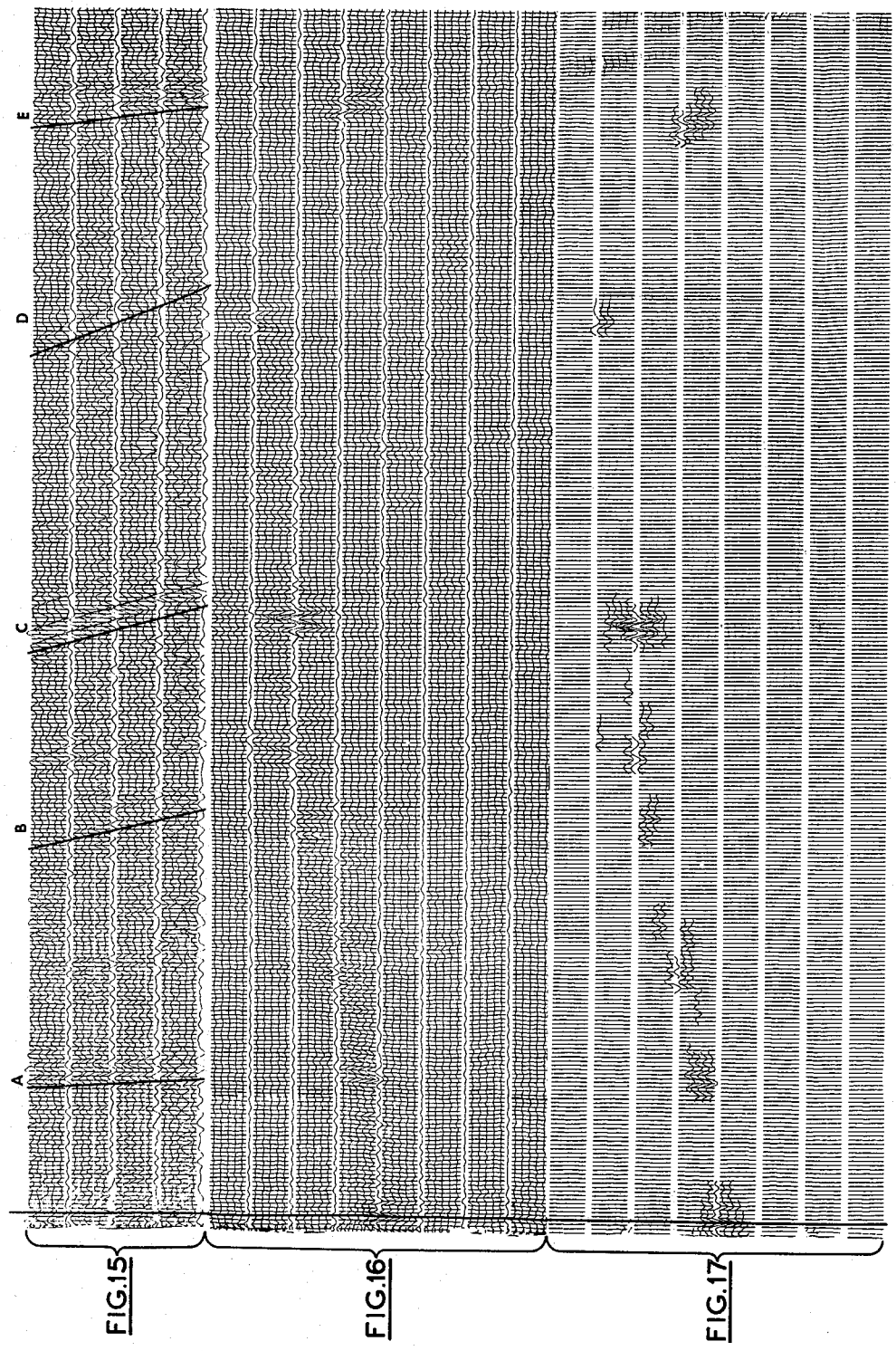

Sept. 15, 1964  W. W. KLEIN, JR., ETAL  3,149,303
SEISMIC CROSS-SECTION PLOTTER
Filed Sept. 29, 1959  8 Sheets-Sheet 5

INVENTORS
WALTER W. KLEIN, JR.
PAUL M. AAGAARD
OKE A. FREDRIKSSON
WILLIAM E. SHOEMAKER
LEE P. STEPHENSON
BY
ATTORNEYS

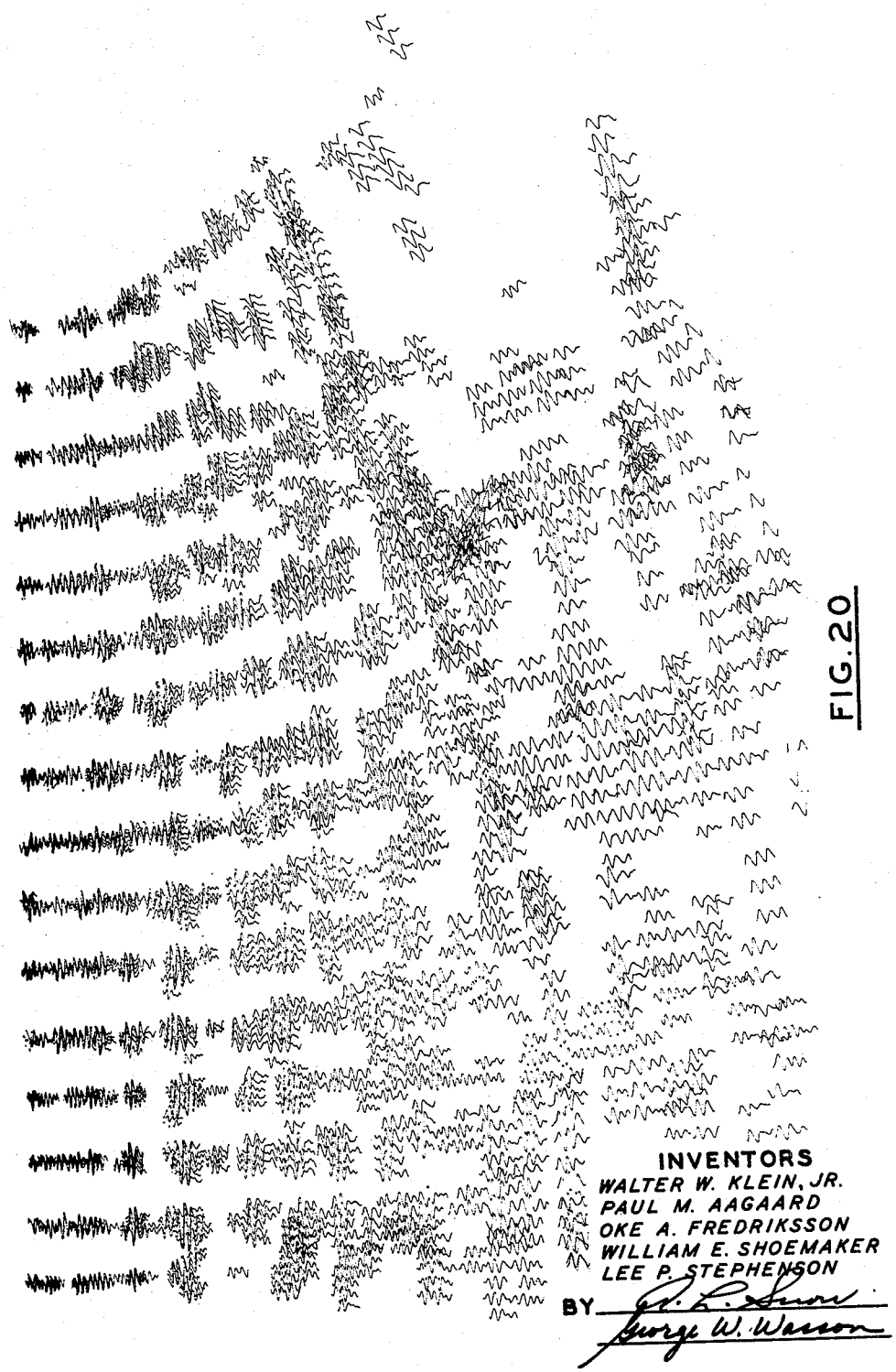

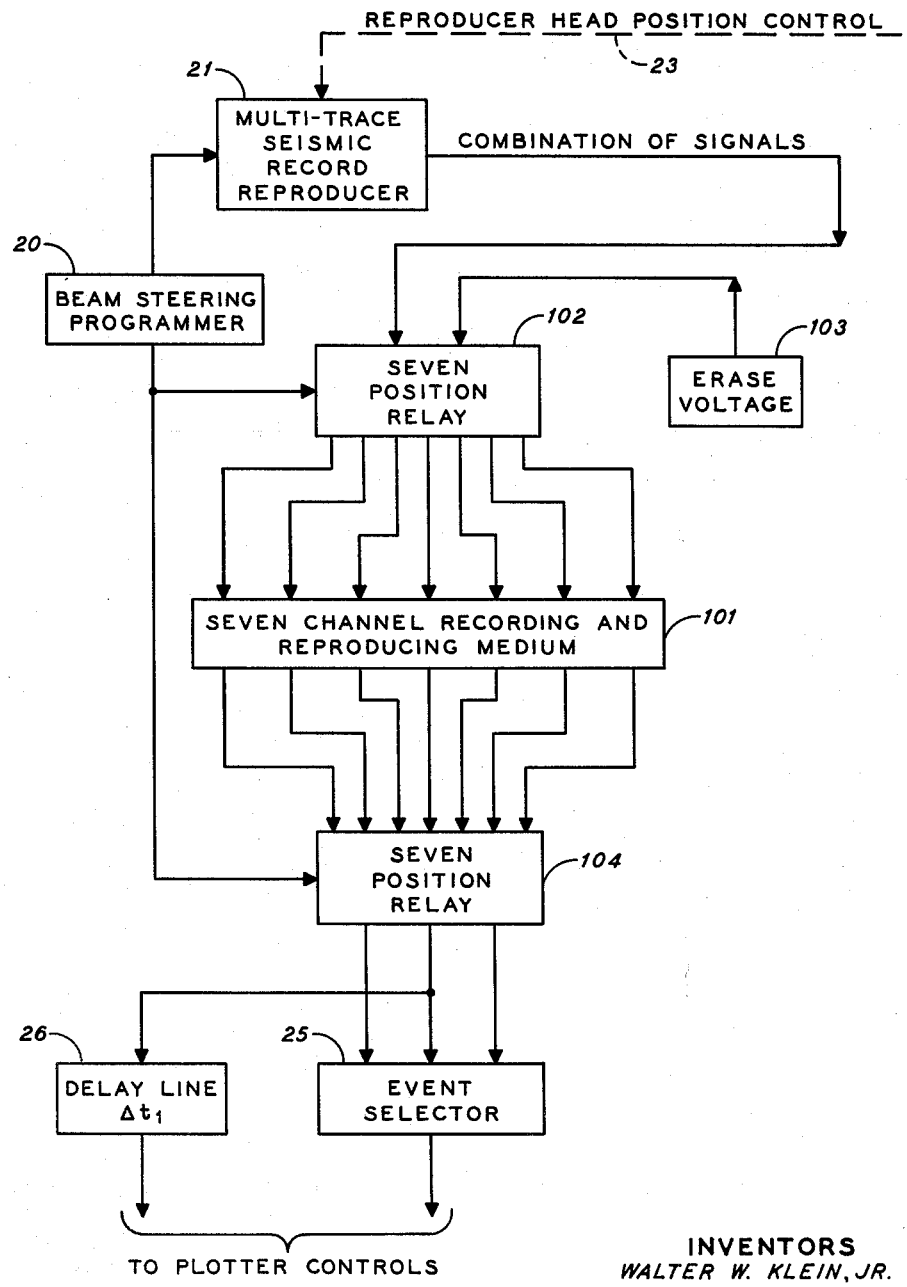

United States Patent Office 3,149,303
Patented Sept. 15, 1964

3,149,303
SEISMIC CROSS-SECTION PLOTTER
Walter W. Klein, Jr., Fullerton, Calif., Paul M. Aagaard, Houston, Tex., and Oke A. Fredriksson, William E. Shoemaker, and Lee P. Stephenson, Fullerton, Calif., assignors to California Research Corporation, San Francisco, Calif., a corporation of Delaware
Filed Sept. 29, 1959, Ser. No. 843,221
11 Claims. (Cl. 340—15.5)

This invention relates to a method and apparatus for automatically processing and displaying seismic data. In accordance with this invention, information in the seismic data relating to underground earth formations may be automatically processed to give a resulting display representing the underground formations in their proper spatial positions with respect to a reference point at or near the earth's surface. Furthermore, the processing is done and resulting display of the data is made without the necessity for intervening human examinations, measurements, or calculations.

Present day methods of seismic surveying involve the initiation of a seismic wave in a geological mass through which the seismic energy is transmitted to be reflected and refracted by the discontinuities in acoustic impedance associated with interfaces between the rock layers, or strata within the earth. Reflected, refracted and diffracted energy from these horizons within the earth is detected at a plurality of geophones distributed over the earth's surface, and a record, preferably in some reproducible form, is produced of the series of individual signals from each of the surface geophones. This record indicates, as a function of time, the mechanical movement of the earth at the location of each of the geophones due to energy received from reflecting or refracting horizons within the earth.

Prior art systems for analyzing information contained in seismic records have disclosed methods for making the static and dynamic time adjustments between the signal traces from the various geophones necessary to produce a corrected, printed record indicating the energy received at the earth's surface by the several geophones. From this record an experienced seismologist may draw certain inferences regarding the subsurface structure within the geological mass being surveyed. From measurements indicating the elapsed time between the initiation of the seismic wave and the arrival of the returned energy at each of the several geophones, the attitudes and the distances of the reflecting or refracting horizons from the point of generation of the seismic waves may be determined if, in addition, certain velocity information is known or assumed about the earth materials.

In the normal course of analyzing such a record, the seismologist must first "pick" the record; that is, he must detect by visual inspection of the recorded information all evidence for the presence of coherent reflected or refracted energy, and note the times of arrival of these coherent "events" at each of the several geophone locations. From these arrival times and a knowledge or estimation of the seismic velocities, he can then compute, by any of several well-known methods, and plot to a suitable scale, the positions in the earth of the geological features responsible for the appearance of the events upon the seismic record. The seismologist may also make use of the distinctive appearance or "character," of the seismic events in following them from record to record and in associating them with particular geologic features. The resulting synthesized picture of the subsurface geometry derived from the picked and plotted events is commonly referred to as a "migrated" seismic section, and the individual seismic events whose positions have been computed and plotted relative to a reference point are said to have been "migrated."

It is commonly found that the visual detection of coherent energy is rendered difficult by the presence of interfering "noise" upon the seismic record. This "noise" may be caused by extraneous factors such as wind, traffic, and the movements of large animals; but of greater importance is the noise associated with the initiation of the seismic wave and appearing in such forms as ground roll, "hole" noise, and energy scattered from minor geological discontinuities. In addition, the reflected or refracted events of interest often interfere with each other, especially in those cases where the subsurface structure is relatively complex. The sum total of noise and interference tends to obscure the reflected or refracted events of interest, making their detection more difficult and resulting in inaccuracies in the determination of their arrival times and characters. As a result, independent analyses of a seismic record by each of several seismologists may produce different interpretations based upon the same seismic information, for an analysis is, to a certain extent, an arbitrary determination governed by the experience and ability of the seismologist making it.

This serious drawback to the interpretation of seismic information was early recognized by Frank Rieber in several of his published articles. His early work has resulted in the issuance of many patents in his name, including Patent No. 2,144,812, issued January 24, 1939, entitled "Method of Geophysical Exploration," wherein a method was described for deriving directional information from energy received at a multistationed surface geophone spread. In this present specification, reference will be made to certain conceptions of Rieber; however, in the most part these references will be to information derived from early suggestions made by Rieber that have been expanded and improved. These references to Rieber are made, in the light of present day advances in seismology, and must be considered in that light in order to appreciate their true relevance to the material of the present specification.

The method of the noted earlier patent to Rieber involved the repeated combining or summing of the recorded signals from a plurality of surface geophones. Each sum was made with the original signals relatively delayed with respect to each other. In the Rieber method, the relative delay imposed between signal traces from neighboring geophones was the same from geophone to geophone in any individual combination or sum. However, each individual combination or sum employed a different repetitive time delay between the signal traces, consistent throughout that individual combination or sum. The purpose was to use the fact that when seismic energy is returned to a surface geophone spread, the wave front of the energy will encounter the individual geophones in a determinable order established by the direction from which the energy is returning. In the system suggested by Rieber, a new multitrace record of combined geophone signals was produced by the method of scanning across the original multitrace record at incrementally different angles to the time axis of the original record. A separate trace was produced on the derived record for each of the incrementally different transverse scans of the original record so that each of the separately recorded traces would contain information for incrementally different relative time delays between the geophones. Through these incrementally different transverse scans of the original record, all signals of the original seismic record were summed in new combinations, and where a returned wave had energized successive individual geophones in a particular sequential order, the scanning of the original seismic record in accordance with this sequential order of reception would produce an enhanced signal. The enhanced signal was produced when the transverse scanning established, in effect, a synthesized array of geophones parallel to the wave front of the reflected energy as it returned to the earth's surface. Any signals arriving at the geophone array in a time-sequential order other than that produced by energy returning to the array from a direction corresponding to the particular angle of transverse scanning of the original record would tend either to cancel or to obscure each other, whereas signals arriving at the geophone array in the correct time sequence would be additive, and would be enhanced.

This present application is related to a method employing some of the Rieber suggestions and is directed to a system for further analyzing the information contained in a conventional seismic record and for the use of this information to actuate a seismic data display apparatus whereby information concerning subsurface reflecting or refracting horizons within the subsurface earth strata may be plotted automatically to eliminate the necessity for prior interpretation by an experienced seismologist. In the copending application of L. P. Stephenson, Serial No. 803,906, filed April 3, 1959, for "Automotive Seismic Data Processing Method and Apparatus," the concept of seismic data processing has been fully described. In accordance with the method of that copending application and the present invention, the seismic traces derived from seismic signals received by a multi-geophone spread at the earth's surface are first adjusted for the static and dynamic time corrections well known to, and commonly applied by, those skilled in the art of seismic surveying. From this corrected seismic record, a multitrace "beam-steered" record is produced through repeated seismic trace combinations, and from the beam-steered record and appropriate velocity data, the automatic plotting device of the present invention is actuated to provide a migrated display of the information received at the geophone array. The present invention further includes plotting of seismic events that have been automatically picked through application of signal strength and signal coherence criteria so that the plotting of the information contained in the original seismic record may be automatically restricted to the significant seismic reflections within the record.

An object of the present invention is a method and apparatus for plotting seismic data.

A further object in accordance with the preceding object is the provision of an apparatus for displaying seismic data along the ray paths of seismic energy into and out of an earth formation.

A further object of the present invention is a novel method and apparatus for the control of a seismic data plotting device whereby seismic data may be accurately displayed along the ray paths of seismic energy.

A further object is a novel control for a reproducible recording device for use in a seismic event selector of a seismic data plotting apparatus.

Further objects and features of the present invention will be readily apparent to those skilled in the art from the specification and appended drawings illustrating a certain preferred embodiment, in which:

FIG. 2 is a sectional view through a geological mass illustrating representative reflection paths for seismic energy;

FIGS. 3 and 4 are portions of multitrace records of energy received in the directions as illustrated in FIG. 2;

FIG. 5 is a composite of the portions of multitrace records of FIGS. 3 and 4;

FIG. 6 is a portion of a beam-steered or sonograph record prepared as indicated in FIG. 5;

FIG. 7 is a block diagram of a resolver for the display apparatus of the present invention;

FIG. 8 is a geometric illustration of the resolution function performed by the apparatus of FIG. 7;

FIGS. 9–14 are wave form diagrams related to the apparatus of FIG. 7;

FIGS. 15–20 are displays of seismic data as may be plotted with the apparatus of the present invention;

FIG. 21 is a block diagram of a temporary storage device for use in energizing an event selector as used in the present invention.

Figure 1:
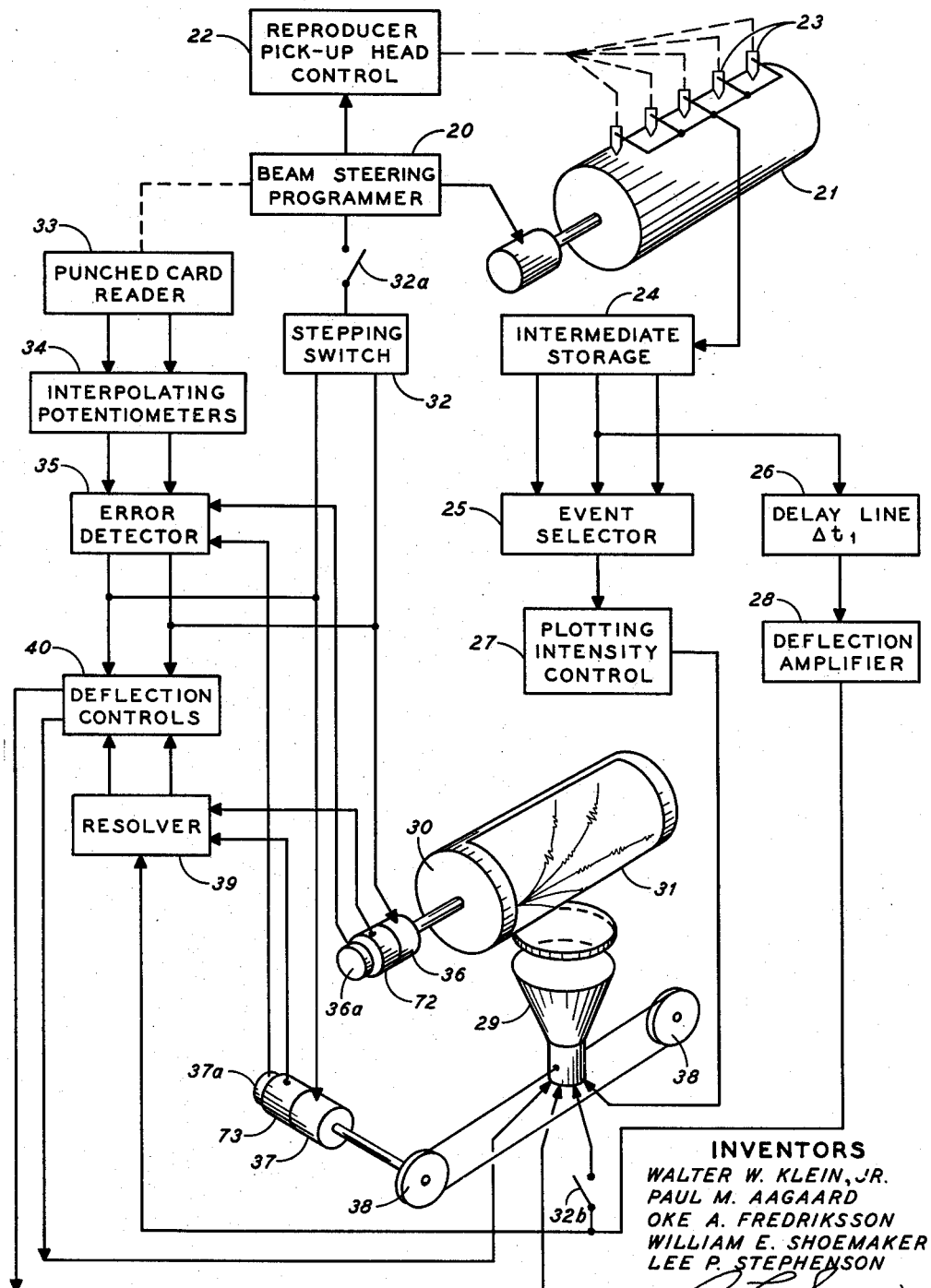
FIG. 1 is a schematic illustration in block diagram form of the seismic data plotting apparatus of the present invention.

In the art of reflection seismic surveying, a seismic impulse is initiated at or near the earth's surface to establish an elastic wave for transmission through the earth. Discontinuities or variations in the structure within the earth will reflect, refract, or diffract this wave train, or a portion thereof, so that the record made at a receiving point will comprise a number of arriving waves, each derived from the original impulse, and each differing from the others in time of arrival or in magnitude or both. Generally speaking, seismic energy will be reflected by subsurface formations that are substantially tangent to the wave front as it travels through the earth formations. The energy reflected by the subsurface reflectors will return to the earth's surface in the form of elastic movements of the earth formations. These movements then may be detected by individual geophones and converted to electrical signals for the production of reproducible traces on a reproducible recording means. These traces will hereinafter be referred to as locational seismic traces, this phrase stemming from the fact that the individual traces are associated with corresponding individual geophone locations. The information in each of these locational seismic traces contains, among other things, the elapsed times between the initiation of the seismic impulse and the arrivals of the various individual events along the seismic trace.

Referring now to FIG. 2 wherein a faulted subsurface formation of a geological mass is illustrated, it may be seen that at least some of the information derived from the seismic motion detected by the geophone spread at the earth's surface will be contained in reflection events from reflectors 9 and 10. For the purpose of this illustration, only six geophones 11 are illustrated as positioned at the surface of an earth formation 12 wherein the reflectors 9 and 10 are located. The geophone spread is positioned about a shot point 13, here shown at the center of the spread, and may consist of many more geophones than the six illustrated.

As energy is transmitted from the shot point 13 into the earth formation 12, it strikes discontinuities at the reflecting horizons 9 and 10 causing reflections to be returned to the geophone spread along paths such as 14, 15, 16 and 17. Because the reflector 9 is directly below the shot point 13, the energy will be reflected substantially vertically to the geophone spread. Under the conditions intended to be represented in FIG. 2, reflector 9 is of such distance below the earth's surface that the wave front of the reflected energy is substantially parallel to the earth's surface when it arrives at the geophones 11 within the spread. The seismic energy travelling along paths 14 and 15 will arrive at each geophone within the spread at substantially the same elapsed time so that the record produced by the geophone spread will contain an event at substantially the same elapsed time along each trace. However, the energy from the tilted reflector 10 that returns along paths 16 and 17 will be received at different elapsed times by the geophones within the spread. The separate traces produced by the separate geophones for the reflection from reflector 10 will show the event arriving at different elapsed times. Part of the energy received by the individual geophones 11 at a particular instant and reproduced on its seismic trace could be reflected from both reflectors 9 and 10 since some parts of these two reflectors are approximately the same distance from the shot point 13. Because of this coincidence in time, the combined energies of the two reflections could intermingle and be substantially hidden one in the other so that neither reflector would be easily defined by simple inspection of the conventional seismic record.

Reference should now be had to FIGS. 2 through 6 where the production of a beam-steered record is indicated in graphic form. In FIG. 2 the central four of the individual geophones 11 are identified by letters $a$, $b$, $c$, and $d$. Paths of the seismic energy reflected through an earth formation are designated by the arrows 1, 2, and 3, indicating energy arriving from directly below the spread and to each side of below the spread. Arrow 1 indicates a typical direction from which no reflection energy is returning. FIG. 3 illustrates signal traces on a multitrace seismic record for the reception of energy arriving in the direction of the arrow 2. In these signal traces, it may be seen that each of the geophones detects seismic energy at the same time. FIG. 4 illustrates the reception of energy in the direction of arrow 3 wherein the trace $a_3$ receives the energy first and each of the subsequent traces $b_3$, $c_3$, $d_3$, receive their energy at some time differential after the first reception of energy at the geophone $a_3$. The traces of FIGS. 3 and 4 would indicate the reception of energy if the energy coming from the directions 2 or 3, respectively, were the only energy to be received at the geophone spread. FIG. 5 illustrates the composite grouping of the two signals of FIGS. 3 and 4 as they might appear if they arrived together at the geophone spread, as for instance, if reflected from horizons 9 and 10 of FIG. 1. Each of the wiggles of the traces $a$, $b$, $c$, and $d$ of FIG. 5 would be a combination of the information found in the traces of FIGS. 3 and 4 wherein trace $a$ would comprise the algebraic sum of the signals as illustrated in FIGS. 3 and 4, trace $d$ would illustrate the signals arriving at two different times such that neither signal would amplify or destroy portions of the other signal, and traces $b$ and $c$ would indicate intermixing of the two signals.

Also shown in FIG. 5, in the form of dotted lines designated 1, 2 and 3, are three different relative time delay relationships for combining the signals found on the composite record. The relationships, as shown, would be those for selecting the signals arriving in the directions corresponding to the arrows shown in FIG. 2. Summing the signals along the line designated 1, as by fixing a plurality of serially connected reproducing devices along the line 1 and reproducing the signal variations in each trace as the full record is moved in the direction of its time axis, would produce a signal as is illustrated in FIG. 6 on the trace designated 1. It should be understood that this signal would show no coherent energy coming from the direction of arrow 1 to the spread as shown in FIG. 2. The trace designated 2 would be the sum of the signals of the FIG. 5 record in the time delay combination shown in the dotted line 2, and the trace designated 3 would be the combination in the time-phase direction of the dotted line 3 of FIG. 5. In that no coherent energy is received from the direction designated by the arrow 1, the time delay combination represented by trace 1 of FIG. 6 illustrates no substantial energy. On the other hand, traces 2 and 3 of FIG. 6 illustrate coherent energy from the directions which correspond to their respective time-lagged combinations of the geophone signals or, stated differently, they display the directionally included information contained in the original seismic record. It should be understood that there would be several separate traces separating traces 1, 2 and 3, with each trace being a different summation combination of the multitrace record of locational seismic traces. The strong signal shown on trace 3 would therefore appear on adjacent traces at lesser amplitudes as the time delay spacing between reproducing devices is adjusted in fixed incremental steps to add the trace signals in different phasing combinations.

In the manner of the foregoing paragraph, a directionally sensitive geophone array is synthesized and the directionality of the array may be adjusted to detect selected signals. The repeated signal reproductions and summations will then display increasing and decreasing indications of the received reflection energy as the sensitivity lobe of the geophone array is swept past the true direction of the reflector causing the energy arriving in the direction of arrow 3. It should also be understood that the pivot point for combining the several traces illustrated in FIG. 5 is merely representative and that the pivot could be from either side of a full seismic record or from the center. The usual pivot point would be at or near the position of the shot point; however, such a pivot point is not required.

When an entire record, as illustrated in FIG. 15, has been processed in the manner of FIGS. 3–6 to combine all signals within the full record in predetermined different time lagged combinations, and in a preselected number of record summations as described in the aforementioned copending application of L. P. Stephenson, a plurality of individual directional seismic traces will have been produced with a separate trace for each of the selected steps of directional sensitivity of the geophone array. These separate traces may be collected into a full record and may be displayed as parallel traces in the manner illustrated in FIG. 16 and hereinafter called a "sonograph record" following the nomenclature established by Rieber. The sonograph record itself may be useful over and above the conventional seismic record. Perhaps the best present use to which an unmodified sonograph record may be put is that of aiding a seismologist in the picking of a conventional record. It is sometimes possible to see certain events on the sonograph record that do not stand out clearly enough on the conventional record to permit confident picking.

The present invention relates to apparatus and methods for plotting the directional seismic information of a sonograph record in useful forms. For example, one very useful transformation of the sonograph record is that in which the directional traces are plotted not as parallel traces along a rectangular strip but as diverging traces emanating from a reference point, which point represents a location at or near the location of the geophones on the earth's surface. The diverging traces proceed downward and sideward, each trace proceeding in varying and different directions from its diverging neighbor traces, while each of the directions corresponds to the estimated actual direction taken by a respective seismic wave ray path in the earth. The display thus produced will herein be called a migrated display of directional seismic traces.

By means of the present invention, the disadvantages of the laborious process of plotting seismic data with the use of a wave front chart is eliminated. However, in order to make clear the advantages of the invention, the possible use of the wave front chart will now be described. A locational record may be thought of as a plot of ground motion in a space whose coordinates are reflection time and geophone location. Through the beam steering process, the locational record is transformed into a directional record wherein ground motion is plotted in a space whose coordinates are reflection time and moveout. Reflection time is the distance along the record measured in time, and moveout is an angular definition of the relative time lag employed in the reproduction of the several traces of the entire record. These coordinates are precisely the ones which are required for plotting with a wave front chart. This being the case, the complete migration of the seismic data presented on a directional record can be achieved in principle by (1) placing each directional trace on the particular ray path of the wave front chart which corresponds to the moveout of that particular directional trace, and by (2) distorting the reflection time scale of the wavefront chart. In this way a seismic data display can be achieved wherein subsurface events are plotted in true depth and offset, relative to a reference point, at locations corresponding to the geologic features which gave rise to those events. However, it will be appreciated that this would be a laborious process, too time-consuming to be used extensively in actual practice. The methods of the present invention generate the desired ray paths and plot them through the use of the apparatus now to be described.

The plotting device of the present invention as shown in block diagram form in FIG. 1 constitutes an apparatus designed to plot both the sonograph-type record and the migrated display of directional seismic traces as is disclosed in the aforementioned copending application of L. P. Stephenson, Serial No. 803,906. Within the device, a programmer 20 energizes a motor for the drive of a reproducible recorder drum 21 on which the records of the individual surface geophones indicating the earth's surface movement in response to a seismic disturbance have been recorded. In the combining of the records to produce the directional seismic traces previously described, the programmer 20 energizes a reproducer pickup head control 22 for adjustably positioning the several reproducer heads 23 to establish the proper time delay between adjacent trace reproductions for extracting directional information contained within the traces. The reproducer pickup head control 22 may also have incorporated into its function the positioning of the pickup heads to apply conventional time corrections to the record of locational seismic traces to take into consideration the relative vertical and horizontal spacing of geophones and other fixed and variable time corrections normally applied to seismic records. With each complete revolution of the recording drum 21, a separate directional seismic trace will be produced, with each trace being a different time lag combination of the several locational seismic traces. Each of the separate directional seismic traces will then be supplied to the intermediate storage device 24. It should be understood that the intermediate storage device 24 may be provided either with a capacity to store the entire number of directional seismic traces to be included in a sonograph record or, since the signals will be analyzed through comparison with the signals developed on neighboring directional seismic traces, the intermediate storage device may be designed to store only that number of directional traces necessary for the analysis of each record for actuation to the remainder of the plotting apparatus. A limited capacity storage device will be more fully described hereinafter.

The signals as stored in the intermediate storage device 24 will be transmitted to an event selector 25 as defined and more fully described in the copending application of Walter W. Klein and Lee P. Stephenson, Serial No. 842,621, filed September 28, 1959, for Information Selection Programmer. In the event selector 25, a plurality of directional seismic traces are compared in absolute amplitude, relative amplitude, and time coherence to select meaningful events on the record. The input to the selector is shown as three separate inputs constituting the center trace and traces to either side of a particular set of directional seismic traces for the identification of meaningful directional seismic information. The separate inputs may constitute either the central and the next adjacent traces from the central trace, or the central trace and outer traces spaced by one from the central trace. The central trace will also be applied to a delay line 26 where the information in the directional seismic trace under analysis will be delayed in an appropriate amount to permit the comparison of the trace at the central portions of seismic events within the trace while permitting the control of the plotting of a seismic event to begin from some time period prior to the most interesting central portion of an event. The event selector 25 will energize a plotter intensity control 27 to permit energization of a suitable plotting device only when a suitable event has been selected for plotting. The selector 25 or the intensity control 27 may also include a holding circuit that will permit the continued plotting of a selected event within the directional trace for an adjustable period after the last satisfaction of the event selection criteria.

When an event has been selected, the intensity control 27 will energize the plotting device, herein illustrated as a cathode ray tube 29, with suitable voltages to intensify the electron beam of the tube. The signal applied to the tube from the deflection amplifier 28 will then, with further processing in some cases, deflect the electron beam of the tube in accordance with the oscillations of the delayed signal from the intermediate storage device 24. The holding control mentioned above will continue suitable energization to the cathode ray tube 29 for an adjustable period designed to include the trailing edge of an event as it is being analyzed in the event selector 25. The directional seismic traces as stored in the intermediate storage device 24 will thus be projected toward a display surface 31 mounted on a rotatable drum 30 to be photographically plotted as records of oscillating traces in varying degrees of intensity to illustrate the events within the directional trace with the events of particular significance dominating the remainder of the trace. The discarded events may be plotted either as dotted lines or in other forms of less dominance or may be eliminated entirely should this be desired.

The relative movement between the cathode ray tube 29 and the rotatable drum carrying the display surface 31 may be accomplished in either of two fashions. Should it be desired to plot the directional seismic traces in the sonograph form of parallel directional traces, it will be necessary only to rotate the drum and to step the position of the cathode ray tube with respect to the display surface as each of the directional traces is being plotted. To accomplish this plot, a stepping switch 32 with associated manual switches 32a and 32b is provided which may be connected to the beam steering programmer 20 to provide for movement of the display surface in accordance with the original program to the pickup heads on the recording device 21. As an alternative, it may be desired to display the information in migrated form wherein each of the directional seismic traces will be plotted from a reference point related to a datum plane within the earth's surface and following the ray path of seismic energy through the earth formation being surveyed. The migrated display of seismic data in the form of directional seismic traces may be considered as a ray path plot of the seismic reflection data with each trace emanating from the reference point at or near the earth's surface. The most usual case would be to place the shot point from which the seismic energy is derived at the center of a geophone spread and to use the shot point as the reference point for the display. In less usual cases where the shot point may be displaced from the center of the geophone spread, the reference point will vary, and it may be shown mathematically that the reference point will be approximately half-way between the shot point and the center of the geophone spread.

To provide for the display of the directional seismic data migrated in accordance with the subsurface velocity variations of the earth formation being surveyed, the plotting device of the present invention includes ray path resolution apparatus for the control of the relative movement and position of the plotting surface 31 with respect to the cathode ray tube 29. To accomplish the relative movements necessary, a punch card reader 33 supplies subsurface coordinates at constant time intervals. The information contained on the punched cards will be sensed and converted to energization voltages necessary for the relative positioning of the plotting device and the cathode ray tube by converter 34. The generated voltages will be appropriately applied to servo motor 36 to rotate the plotting drum 30 and to servo motor 37 to position the cathode ray tube 29 by rotation of pulleys 38 connected by cable to the cathode ray tube.

Referring now to the display as illustrated on the display surface in FIG. 1, it may be seen that the individual ray paths as therein illustrated are not straight radial lines emanating from a central shot point but are curved or flared as are the actual ray paths of seismic energy into and out of a geological cross-section. It is well known in the seismic arts that the energy from a seismic disturbance in the earth's surface travels with increasing velocity through the subsurface formations as the compaction of the formation increases. Furthermore, as the energy passes from a lower velocity medium into a higher velocity medium striking the higher velocity medium at some angle other than normal to the interface, some of the energy is reflected back from the interface, while the rest of the energy passes through with the direction of the transmitted energy being different from the direction of the incident energy in accordance with the ratio of the velocities of transmission within the two contiguous formations. Because of this, the ray paths of the seismic energy will not be straight lines through the subsurface formations, with the occasional exception of the path starting vertically down into the formation, but will be curved ray paths, usually with more noticeable curvature the greater their deviation from the vertical. For these reasons, it is necessary to energize the motors that control the relative movement of the display surface and oscilloscope in accordance with certain velocity information that may be known for the formation being analyzed or that may be assumed upon the basis of other knowledge about the probable composition and configuration of the subsurface. The plotter of the present invention provides for the inclusion of this velocity information through predetermined ray path identifications established by prepunched cards.

The motors 36 and 37 may be appropriately energized in accordance with the ray paths identified by a plurality of separate punched cards to be read by punched card reader 33 with each of the separate cards being prepunched in accordance with information establishing a separate migrated trace emanating from the reference point. In this manner, as each directional trace is produced and analyzed, the ray path information contained on an appropriate punched card will determine the energization for motors 36 and 37 to provide the proper X and Z coordinate displacements of the display surface 31 with respect to the oscilloscope 29.

The information on the punched cards is in the form of digital data identifying the coordinates of a plurality of positions within a geologic cross-section. The punched cards represent X and Z coordinate identifications of the plurality of positions at incremental time periods along a seismic energy path through the known or assumed earth formation with each group of punched holes representing the movement necessary to effect travel from the position of the last coordinate identification to a new coordinate position. The punched digital data is sensed at appropriate time intervals and interpolating potentiometers then establish the necessary voltages for energization of the appropriate motion producing motors 36 or 37 to effect the necessary relative movement between the display surface 31 and the oscilloscope 29.

One feature of the plotter movement control of the present invention is a novel manner for substantially eliminating the effect of inertia in the several components of the plotting apparatus. It should be apparent that for each set of digital data on the punched cards used for establishing migration ray paths, there could be an instantaneous command forwarded to the drive motors of the plotting device. Between the increments of digital data, the interpolating potentiometers will smooth out the commands but, whenever a sharp or fast movement is required, there would always be some finite period required for response and for movement to the commanded position. In the apparatus of the present invention, an error command system is provided for maintaining accurate plotting of the input data. The accuracy is maintained by sensing the error between the commanded position as interpolated by the potentiometers and the instantaneous position of the plotting elements, or of their drive motors, energizing the servo motors 36 and 37 with the error signal to bring the command and actual position into coincidence. At the same time, the deflection voltages supplied to the oscilloscope to position the electron beam of the oscilloscope are modified in accordance with the error signal. In this manner, any error in position is corrected by movement of the inertialess electron beam and the seismic data supplied to the oscilloscope from the intermediate storage device 24 is plotted substantially exactly in the position commanded by the punched card digital data. The foregoing servo follow-up function is performed by the error detector 35 as energized by the interpolating potentiometers and the position sensing devices 36a and 37a associated with the motors 36 and 37, respectively. Any output of sensed error between interpolated command position and actual position is supplied as additional input to the deflection control 40, more fully described hereinafter, associated with the oscilloscope 29.

Figure 18:
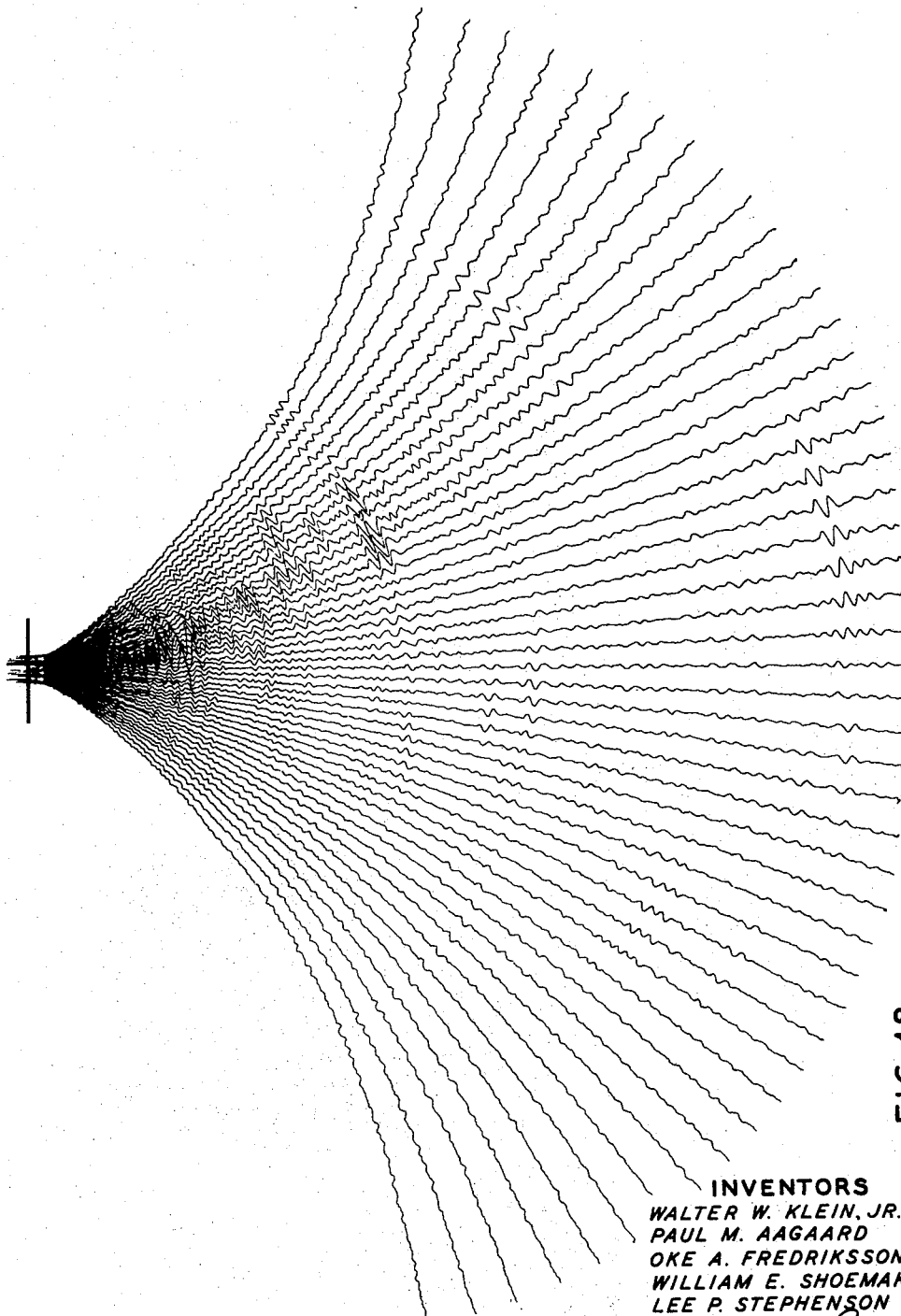
Figure 19:
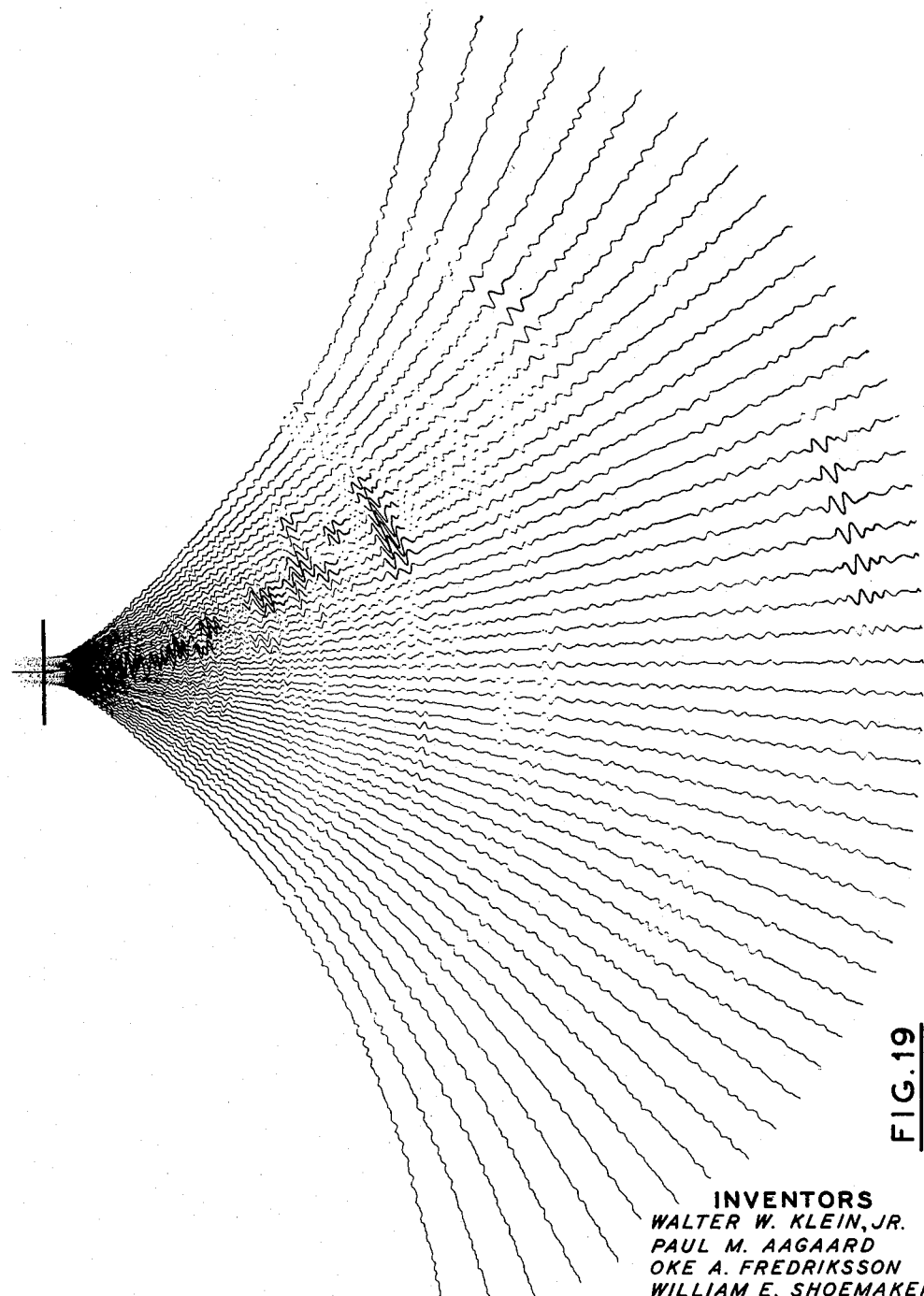

For the purposes of display of the flared ray path seismic cross-section as illustrated in FIGS. 18–20, it is necessary that the instantaneous display of the beam-steered seismic record be at all times perpendicular to the individual ray path being then displayed. For this purpose, as the ray path curves in accordance with the velocity data input, it is necessary that the individual excursions of the electron beam moving in accordance with the seismic data be not just perpendicular to a line between the reference point and the X–Z coordinate of the position of the beam at a particular instant, but perpendicular to the immediate ray path direction. To accomplish this movement, a resolver 39 senses the instantaneous rate of rotation of the motors 36 and 37, as derived from tachometers 72 and 73, respectively, and provides an output to the oscilloscope 29 to accomplish the desired relationship.

From the foregoing description of the individual components assembled into the apparatus of the present invention, it may now be seen that the individual groups of signals produced by the individual geophones 11 in response to movement of the earth formation due to reflected energy from the seismic disturbance now have been processed to give a direct representation of a seismic cross-section indicating the reflecting horizons within the cross-section in both distance and angular displacement from the source of the seismic energy. With the present invention it is now possible to initiate a seismic explosion at the earth's surface and to record, correct, analyze and display the information derived in the form of a complete cross-section of the formations in question with a minimum of time delay and without intervening manual interpretation of the information within the produced records.

One of the novel components of the combination of apparatus of the present invention is the resolver 39 for the control of the individual excursions of the electron beam within the oscilloscopes displaying the seismic data. FIGS. 7–14 illustrate and define the resolver 39 and the performance of its duty. FIG. 7 is a block diagram illustration of the elements for the analysis of the instantaneous relative positions of the oscilloscope and display surface from which the desired direction of electron beam excursion is to be controlled. Referring first to FIG. 8 wherein a separate ray trace is shown having a curved path as may be encountered in the other than vertical ray paths of seismic energy within the formation, a particular point on the ray trace has been singled out and a perpendicular to the trace has been drawn at that point. The perpendicular makes an angle $\phi$ with the horizontal. In the plotting operation, the seismic signals of directional seismic traces are superimposed upon the ray trace with the oscillatory excursions of the signals being in a direction perpendicular to the ray trace, for instance, in the direction of the arrow drawn perpendicular to the ray trace. In FIG. 7, the drum 30 carrying the display surface 31 and the oscilloscope 29 for scanning the display surface 31 are shown with their respective drive motors 36 and 37. It may be seen that with the plotting of a curved ray path on the display surface 31 so that part of the ray trace assumes the angle $\phi$ with the vertical, the corresponding oscillation represented on the cathode ray tube face takes on a vertical and horizontal component. The vertical component must be equal to the unmodified value of the seismic signal multiplied by the sine of $\phi$ and the horizontal component must be multiplied by the cosine of $\phi$. In this manner the vector resultant of the two components is the same as that of the original seismic signal and will have its excursions equal to the strength of the seismic signal, regardless of whether they are vertical, horizontal, or at the angle $\phi$ with respect to the horizintal.

The resolver 39 takes the seismic signals from the directional seismic traces that are fed into it and at one point multiplies these signals by the sine of $\phi$ and at another point by the cosine of $\phi$ and then applies these two components of the signals to the vertical and horizontal deflection plates of the scanning cathode ray tube. To accomplish this, the resolver includes a carrier frequency source 71 which may be an oscillator or a generator of alternating current having a frequency several times the highest frequency component of the seismic signal. The frequency of the carrier source must be several times the frequency of the seismic signal, since it must sample the seismic signal at the carrier frequency and produce a representation of the signal by discrete samples. The carrier frequency is fed to an X rate tachometer 72 and a Z rate tachometer 73, the tachometers being means for measuring the instantaneous rates at which the display surface 35 and the oscilloscope 37 are moving in the X and Z direction, respectively, these rates determining the angle $\phi$. It should be understood that while FIG. 7 illustrates the feed of the carrier to the tachometers, the apparatus may take the form of FIG. 1 wherein the tachometer signal is fed to the resolver 39 for combination with the carrier frequency. The output of the X rate tachometer is applied as input to a 90° phase shifter 74 and has its output joined with the output of the Z rate tachometer in a voltage divider network constituting a pair of resistors 75 and 76 with the resistors joined at junction 77. The voltage appearing at junction 77 will, therefore, be the vector sum of a 90° phase shifted voltage from the X rate tachometer and the Z rate tachometer oscillating at the frequency of the carrier source and displaced from the carrier frequency by the angle $\phi$. The voltage at the junction 77 is fed through a limiter 78 to a chopper 79. It is desired to use only the phase angle information in the voltage at 77, so the limiter 78 operates to establish a constant voltage output.

The chopper 79 has the directional seismic trace being analyzed and plotted as one input along with the displaced voltage at angle $\phi$ oscillating at the frequency of the carrier source. The output of the chopper 79 is in the same form and direction as the input during half of each period of the carrier frequency and during the other half of the period the output is inverted, or the negative of the input, this inversion being the function of the chopper. FIG. 9 shows a portion of a seismic signal input, and FIG. 10 shows a chopped seismic signal. In the wave form of FIG. 10, the tops of each of the individual pulses are shown as substantially horizontal. In actuality they would, of course, not be truely horizontal, but in the form shown they represent the fact that during each half period of the carrier, the seismic signal can be considered as if it were a constant D.C. current, represented only by the pulse height and not by its shaped details.

FIG. 11 illustrates a single cyclic pair of pulses in the output of chopper 79 that will be applied as the input to the bandpass filter 81. The bandpass filter 81 cuts out all of the higher harmonics of the carrier frequency and is centered on the carrier frequency to leave a sine wave as its output as shown in FIG. 12. The sine wave output of FIG. 12 is fed to choppers 82 and 83 with chopper 82 having an additional input from the carrier frequency source while chopper 83 has an input at the carrier frequency and shifted 90° by phase shifter 84. The choppers 82 and 83 are therefore energized with common signals from filter 81 and by 90° differing signals at the carrier frequency.

Considering first the chopper 82, its input from the bandpass filter 81 is a sine wave at the carrier frequency and delayed by the angle $\phi$ along with the direct signal from the carrier frequency source. The chopper 82 passes half of the sine wave input and inverts the other half of the sine wave input at the repeating rate of frequency of the input from the carrier source 71. FIG. 13 illustrates the effect on the sine wave input to the chopper due to the chopping and inverting of the second half of the since wave input. The chopper 82 output will now be pulses of the sine wave input all going positive through the inversion of the negative half of the sine wave input to the chopper. By inspection of the wave form of FIG. 13 and by visualizing what will happen as the angle $\phi$ is varied, it may be seen that where $\phi$ is zero, the sine wave is converted into a set of only positive half cycles. As angle $\phi$ is increased, part of the converted signal becomes negative, and if angle $\phi$ were increased to 90°, the positive and negative portions would become equal. The output of the chopper 82 is fed to a low pass filter 85 which blocks the frequencies of the order of the carrier frequency and passes the seismic frequencies, so that the filter now acts as an integrator of the sine wave input and converts it into a current having the integrated value of the chopped sine wave. The filter, therefore, passes the relatively low frequency of the seismic input and multiplies the seismic signal by the integrated voltage varying from a high, when the angle $\phi$ is zero, to a low, when the angle $\phi$ is 90°. This relationship of a high at an angle of zero to a low at an angle of 90° is actually a variation at the rate of the cosine of the angle $\phi$, so that the horizontal deflection on the oscilloscope 37 is actually being varied in accordance with the cosine of the angle $\phi$.

Referring back to the input to chopper 83 comprising the output from the bandpass filter 81 and the 90° phase-shifted carrier source, the first input to chopper 83 therefore lags the input to chopper 81 by 90° minus the angle $\phi$. This phase difference of 90° minus $\phi$ will produce a relationship of the sine of $\phi$ so that the output from the chopper 83, processed in the same manner as described with respect to chopper 82 and passed to a second low pass filter 86, will carry the seismic signal multiplied by a voltage proportional to the sine of the angle $\phi$. The output from the low pass filter 85 is applied to the horizontal deflection plate 87 and the output from the low pass filter 86 is applied to the vertical deflection plate 88 so that the movement of the electron beam in the oscilloscope will make excursions on the face of the oscilloscope in accordance with the vector sum of the seismic signal multiplied by the cosine of the angle $\phi$ and the seismic signal multiplied by the sine of the angle $\phi$. It may now be seen that a display of seismic data on a migrated ray path moving through the subsurface earth formations will have the indications of reflected seismic energy superimposed thereon perpendicular to the instantaneous direction of travel of the seismic ray.

FIG. 21 is a block diagram of a limited capacity temporary storage device for use with the event selector as employed in the seismic data plotter of the present invention. Previously in the specification of this application, the directional seismic traces derived from the locational traces of a conventional seismic record have been referred to as a complete record constituting a plurality of directional traces with the plurality determined by the time delay adjustment between the several summations of the conventional record signal. It should be obvious that the analysis of the directional seismic traces to detect the existence of a legitimate seismic event requires only a few of the traces for the selection of events for plotting. In the copending application of Lee P. Stephenson and Walter W. Klein, Serial No. 842,621, filed September 28, 1959, for "Information Selection Programmer," a method and apparatus for performing the comparative analysis of directional seismic traces for the selection of information to be used as the energization of a data plotting device has been disclosed. In the systems as disclosed in that copending application, the analysis of directional seismic traces has been described for the comparison of a group of three adjacent directional seismic traces for the selection of legitimate seismic events within the central of the three traces. That application further discloses that the use of three traces is arbitrary and that the number of traces selected for the comparison will be determined by the sensitivity pattern of the geophone array and by the time delay employed in extracting the directional seismic information from the locational seismic traces. In the aforementioned copending application of Lee P. Stephenson, Serial No. 803,906, filed April 3, 1959, for "Automatic Seismic Data Processing Method and Apparatus," it has been disclosed that in the analysis of some seismic signals, it may be desirable to use as many as five adjacent directional seismic traces to derive the selection of events within a central trace. Under any circumstances, it is not necessary to produce and store all of the directional seismic traces since only a limited few are actually used at any one time in the selection of events for plotting. A temporary storage of the required number of traces may, therefore, satisfy the analysis requirements. To accomplish the temporary storage of directional seismic traces for the analysis purpose, the apparatus as shown in block diagram form in FIG. 21 is provided. In the apparatus, the multitrace seismic record recorder is shown at 21 with a mechanical connection from the reproducer head position control 33 and a suitable connection from the beam steering programmer 20. The output of the reproducer 21 will be directional seismic traces constituting the summation signal of all of the locational seismic traces with suitable interposed time delays between adjacent traces. Each positioning of the reproducing heads by the beam steering programmer 20 will establish a different directional seismic trace and each of these directional seismic traces in order of production will be applied through a sequencing switch here illustrated as a seven position relay 102 to a seven channel continuous reproducible recorder means 101 rotating in synchronism with the reproducer 21. Each channel of the recording medium will have the necessary elements to record, reproduce and erase the signals within its channel including heads for recording, reproducing and erasing or a single head capable of performing all duties. The relay 102 is stepped through each of its seven positions by the beam steering programmer 20 so that in each subsequent positioning, the directional seismic traces then produced from the reproducer 21 are applied in sequence to a different one of the seven separate channels of the recorder 101. Also supplied through the seven position relay 102 is an erase voltage from source 103 that may be used to erase selectively a signal from any one channel of the recorder 101 to prepare that channel for the recording of a new signal.

Considering now the circuit of FIG. 21, it may be seen that as the locational seismic traces on the reproducer 21 are combined to produce a directional seismic trace, each of the sequentially produced traces will be applied by the relay 102 to a separate channel of recorder 101. The relay will supply each trace as it is produced as input for recording on the recorder 101 and, in subsequent revolutions, will supply an erase voltage to be applied sequentially to each channel as a new input signal is supplied for recording in another channel. The relay thus retains five recorded directional traces on five of the channels at all times while erasing one channel and applying a new signal to another.

The signals as recorded on the recorder 101 are reproduced and supplied through a second seven position relay 104 to the event selection programmer 25 and delay line 26 as also shown in FIG. 1. The second relay 104 is controlled from the programmer 20 to provide as its output the selected number of directional seismic traces as are required for the analysis performed in the programmer 25. It may be seen that should five channels be selected for the analysis purposes, these channels may be provided as the directional seismic traces are produced in the reproducer 21 and that the five directional traces being analyzed will continuously change in a series of steps as the directional seismic traces are produced. At the same time, the relay 102 will apply the erase voltage from the source 103 in sequence to each of the channels to erase the signal that has been on the recorder 101 the longest, thus providing a clean channel for a new signal of the next directional seismic trace. The output of the event selector 25 and delay line 26 will be applied to the previously described controls for the plotting cathode ray tube 29, where the signal is applied through the resolver 39 to the deflection controls 40.

Through the use of the limited capacity storage device as illustrated in FIG. 21, the complete analysis of the directional seismic traces may be performed without the need of storing all of the directional seismic traces. The analysis may be performed as soon as a sufficient number of directional traces are recorded and will continue until all usable directional information has been derived from the locational traces and all of the data in the intermediate storage device has been analyzed. It should be apparent that it is impossible to comparatively analyze the first few and last few directional traces produced since it is necessary to have traces having directionality to both sides of the trace being compared to produce the appropriate analysis.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

We claim:

1. Seismic data plotting apparatus comprising a cylindrical display surface rotatable about its central axis, a cathode ray oscilloscope movable parallel to the axis of said display surface, means for rotating said display surface, means for moving said oscilloscope parallel to the axis of said display surface, means for extracting directional seismic information from locational seismic data, means for energizing said oscilloscope with said directional seismic information, and means controlled by said extracting means for simultaneously controlling said means for rotating said display surface and said means for moving said oscilloscope in accordance with the directional seismic information energization of said oscilloscope, to plot said extracted directional seismic information along seismic energy ray paths.

2. A seismic cross-section plotter comprising in combination:
   (a) seismic data processing means for deriving directional seismic data from locational seismic information including means for combining said locational seismic information in a plurality of different time adjusted combinations, each combination deriving seismic data having a distinctive directional characteristic,
   (b) a rotatable drum for supporting a photosensitive display surface,
   (c) a movable oscilloscope source for generating a light producing beam, means for energizing said source by said directional seismic data to be plotted and including means for controlling the intensity of said light producing beam and means for positioning said light producing beam with respect to said source in accordance with signal amplitude variations within said directional seismic data, (d) motion producing means including simultaneously operable means for controllably rotating said drum and means for controllably moving said source parallel to the axis of said rotatable drum in accordance with said derived directional seismic data, and means controlled by said means for combining to synchronize said motion producing means with said seismic data processing means to control rotation of said drum and movement of said light source to plot said seismic data on said display surface.

3. In the combination of claim 2, the additional means comprising a source of seismic ray path data, means for sensing said ray path data, and means for energizing said motion-producing means in accordance with said data to produce said simultaneous movement of said drum and source whereby said plotted directional seismic data is displayed in migrated form from a reference point on said display surface.

4. In the combination of claim 2, the additional means comprising a source of seismic ray path data, means for sensing said ray path data, means for energizing said motion-producing means in accordance with said data to produce said simultaneous movement of said drum and source whereby said plotted directional seismic data is displayed in migrated form from a reference point on said display surface, additional means for sensing the rate of rotation of said drum and the rate of movement of said source with respect to said drum, and means for controlling the position of said light producing beam with respect to said source to maintain the plotting of said directional seismic data perpendicular to the seismic ray path being sensed in said source of ray path data.

5. In the combination of claim 2, the additional means comprising a source of seismic ray path data, means for sensing said ray path data, means for energizing said motion-producing means in accordance with said data to produce simultaneous movemen of said drum and source whereby said plotted directional seismic data is displayed in migrated form from a reference point on said display surface, additional means for sensing the rate of rotation of said drum and the rate of movement of said source with respect to said drum, means for controlling the position of said light producing beam with respect to said source in accordance with said rates sensed by said additional means to maintain the plotting of said directional seismic data perpendicular to the seismic ray path being sensed in said source of ray path data, means for sensing the relative position of said display surface and said source, means for comparing the instantaneous sensed relative position of said display surface and said source with the sensed ray path data to establish a signal indication of error therebetween, and circuit means energizing said means for moving said light producing beam of said source with respect to said source and said motion producing means to position said light producing beam to compensate for said error indication.

6. A seismic cross-section plotter comprising a means for reproducibly recording a plurality of individual locational seismic traces, means for simultaneously reproducing each said individual locational seismic traces, means for individually adjusting the reproduction of each said locational seismic traces to compensate for fixed and variable time variations present along each of said traces, means for individually adjusting the reproduction of each of said locational traces to establish fixed incremental time differences in the reproduction of each separate trace with respect to the trace next adjacent thereto, means for summing the reproduction of all of said locational seismic traces to produce a directional seismic trace, preprogrammed means for changing said incremental time difference in trace reproductions to produce a plurality of different directional seismic traces, means for reproducibly recording each of said different directional seismic traces, means for reproducing a related plurality of said different directional seismic traces, means for correlating signals within said related plurality of traces, a display surface, means for rotating said display surface, means for producing a visual recording on said display surface, means for effecting relative movement between said visual recording means and said display surface in accordance with subsurface seismic ray path information, and means for energizing said visual recording means with said correlated signals within said directional seismic traces.

7. The apparatus of claim 6 with the addition of means for aligning said visual recording means with respect to said display surface to display said correlated signals normal to the seismic ray path being displayed on said display surface.

8. In a seismic cross-section plotting apparatus including means for processing individual locational seismic traces to a plurality of directional seismic traces and including a display means, a light source, means for moving said light source with respect to said display means in accordance with said directional seismic traces, the improvement comprising a source of seismic energy ray path information, means for selecting said information in accordance with the direction of each of said directional seismic traces, means for resolving said seismic energy ray path information into Cartesian coordinates, means for simultaneously moving said display surface and light source with respect to each other in accordance with said Cartesian coordinates to effect movement of said light source with respect to said display surface in accordance with said seismic energy ray path information, and means energized by said resolving means for controlling oscillatory movement of said light source so that excursions within said directional seismic traces are at all times perpendicular to the ray path being displayed on said display surface.

9. In a seismic cross-section display apparatus including means for processing a plurality of individual locational seismic traces to a plurality of directional seismic traces, a rotatable cylindrical drum, an oscillatory light means movable relative to said drum, means for energizing said light means with said directional seismic traces, and means for producing relative movement between said light means and said rotatable drum to effect movement of said light means from a reference point over said display surface in a plurality of separate paths travelled by seismic energy within said earth formation, the improvement comprising apparatus for correlating seismic events within said directional seismic traces comprising a multichannelled reproducible recording means, a sequencing switch, means for separately recording adjacent directional traces on said reproducible recording means through said sequencing switch until a preselected plurality of directional seismic traces have been recorded on said reproducible recording means, means for reproducing all of the directional seismic traces recorded on said reproducible recording means, means for comparing a predetermined plurality of said reproduced directional seismic traces to correlate seismic events within a first of said reproduced directional seismic traces, means for energizing said oscillatory light means by said first directional seismic trace in accordance with said correlations, means controlled by said sequencing switch including means for erasing one of said recorded directional seismic traces and means for recording a new directional seismic trace with each rotation of said reproducible recording means, means for correlating a new preselected plurality of recorded directional seismic traces, and means for continuously recording, erasing, and correlating said directional seismic traces until each directional seismic trace has been correlated with said predetermined plurality of adjacent seismic traces and each correlation has been employed to energize said oscillatory light means.

10. The method of plotting a seismic cross-section from seismic data initially in the form of a plurality of individual locational seismic traces, said cross-section being a display of a plurality of directional seismic traces plotted along the ray paths of seismic energy through an earth formation comprising the steps of separately recording each of said locational seismic traces on a reproducible recording medium, extracting directional seismic information in the form of said directional seismic traces from said locational seismic traces, energizing a plotting means in a sequential manner with each of said directional seismic traces to reproduce said directional seismic traces on a plotting surface, and simultaneously moving said plotting means and display surface relative to each other in accordance with said sequential manner and with the seismic ray path followed by the directional seismic trace being plotted.

11. The method of plotting a seismic cross-section from seismic data initially in the form of a plurality of individual locational seismic traces, said cross-section being a display of a plurality of directional seismic traces plotted along the ray paths of seismic energy through an earth formation comprising the steps of separately recording each of said locational seismic traces upon a reproducible recording medium, extracting directional seismic information in the form of directional seismic traces from said locational seismic traces by repeatedly combining said locational seismic traces in incrementally different time lag combinations, energizing a cathode ray oscilloscope with said directional seismic information, producing relative movement between said oscilloscope and a displaced surface in accordance with the seismic ray path followed by the directional seismic trace being plotted, and controlling the deflection of said cathode ray oscilloscope in accordance with said relative movement to plot seismic events within said directional seismic traces perpendicular to the ray path being followed.

References Cited in the file of this patent
UNITED STATES PATENTS

| | | |
|---|---|---|
| 2,203,353 | Goldmark | June 4, 1940 |
| 2,527,562 | McCormick | Oct. 31, 1950 |
| 2,604,955 | Hawkins | July 29, 1952 |
| 2,771,593 | Straehl | Nov. 20, 1956 |
| 2,861,507 | Palmer | Nov. 25, 1958 |
| 2,897,476 | Widess | July 28, 1959 |
| 3,025,123 | Klein | Mar. 13, 1962 |